Nov. 3, 1959    J. CAUCHOIS ET AL    2,911,593
APERIODICAL LINEAR PHASE DETECTORS
Filed Aug. 24, 1956    2 Sheets-Sheet 1

United States Patent Office 2,911,593
Patented Nov. 3, 1959

2,911,593

APERIODICAL LINEAR PHASE DETECTORS

Jean Cauchois and Marcel Constant, Paris, France, assignors to Compagnie Generale de Telegraphie Sans Fil, a corporation of France Application August 24, 1956, Serial No. 605,987

Claims priority, application France September 14, 1955

4 Claims. (Cl. 324—87)

The present invention relates to phase detecting devices used in radio receiving systems.

Such devices are used for measuring the phase shift of one signal with respect another signal of equal amplitude.

In certain detecting devices of known type, use is made of tuned circuits to obtain two signals, the first being equal to the sum, and the second to the difference of the two signals to be compared. These voltages are detected and the D.C. voltages thus obtained are subtracted from one another. If the signals to be compared are of equal amplitude and if the detecting devices all have linear characteristics, it can be shown that the D.C. voltage obtained at the output of the phase detectors of this type is substantially proportional to the phase difference of the two input signals. Phase detectors of this type show two main drawbacks:

(1) The sum and the difference of the signals to be compared are obtained by means of tuned circuits which are inherently periodical.

(2) The detection systems used are thus never linear, and the D.C. voltage obtained at the output of the phase detectors of this type is not a linear function of the phase difference to be measured.

It is an object of the present invention to provide a phase detector of this type, wherein these disadvantages are eliminated.

The phase detecting device, according to the invention, comprises essentially a combination of impedance bridges adapted to produce, respectively, signals equal to the sum and to the difference of the signals to be compared.

According to a preferred embodiment of the invention, the signals thus obtained are detected by means of detecting systems having a constant power factor, for any amplitude of the signal to be detected, the load resistances remaining substantially proportional to the internal resistance of the rectifying diodes used.

Preferably, these load resistances are diodes or crystals having similar characteristics to those of the detecting diode or crystal.

The device may be used over the whole range of frequencies from low to ultra high frequencies.

The invention will be more fully understood when considered in conjunction with the following specification and the drawings; in these drawings, which show, by way of example, a few embodiments of the device:

Figure 1:
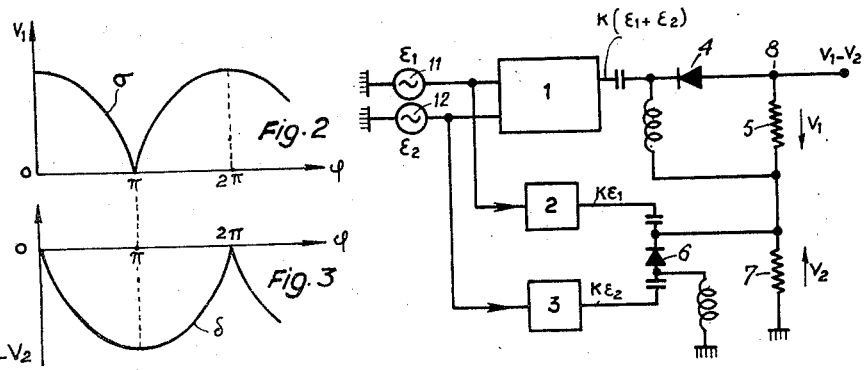
Fig. 1 represents schematically a phase detector of the prior art.

Referring to Fig. 1, the two signals to be compared, $\epsilon_1$ and $\epsilon_2$, are supplied by two alternating voltage sources 11 and 12. At the output of a voltage divider 1, of a conventional type, there appears an alternating voltage having the value: $K(\epsilon_1+\epsilon_2)$, K being a constant. The voltage thus obtained is applied to a first detector 4 supplying through the load resistance 5 a direct voltage $V_1$.

The two signals $\epsilon_1$ and $\epsilon_2$ are also applied, respectively, to the input of voltage dividers 2 and 3, which supply alternating voltages $K\epsilon_1$ and $K\epsilon_2$, differentially applied to the terminals of detector 6, the latter feeding a direct voltage $V_2$ equal to $K(\epsilon_1-\epsilon_2)$ through load resistance 7.

Load resistances 5 and 7 of the detectors being connected in opposite directions to one another, a direct voltage $V_1-V_2$ is collected between point 8 and ground.

Calculation shows, and experience confirms, that, if the detecting devices 4 and 6 have linear characteristics, and if $\varphi$ is the phase difference existing between the signals $\epsilon_1$ and $\epsilon_2$ assumed to be of equal amplitude, voltage $V_1$ is proportional to $|\cos\varphi/2|$ and voltage $V_2$ proportional to $|\sin\varphi/2|$.

Figure 2:
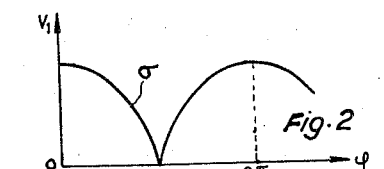
Figs. 2, 3 and 4 are diagrams, explaining the operation of the device of Fig. 1.
Figure 3:
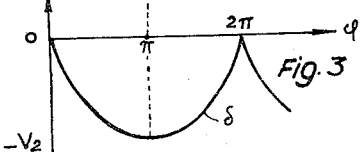

The diagrams illustrating the variations of these voltages $V_1$ and $V_2$ as a function of the phase difference $\varphi$ between signals $\epsilon_1$ and $\epsilon_2$ are represented, respectively, at $\sigma$ and $\delta$ in Figs. 2 and 3.

Figure 4:
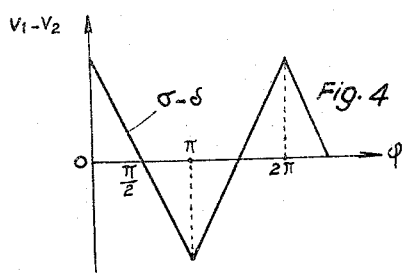

The curve obtained by summing up algebraically the amplitudes of these two curves, and which represents the variations of the function $V_1-V_2$, is shown in Figure 4. Said curve is formed, as a function of $\varphi$, of curve elements fitted together by angular points, said elements being each substantially in the shape of a straight-line section. It follows therefrom that, during the variation intervals of $\varphi$, $0-\pi$, $\pi-2\pi$, $n\pi-(n+1)\pi$, the output voltage $V_1-V_2$ is a substantially linear function of the phase shift of one signal with respect to the other.

Figure 5:
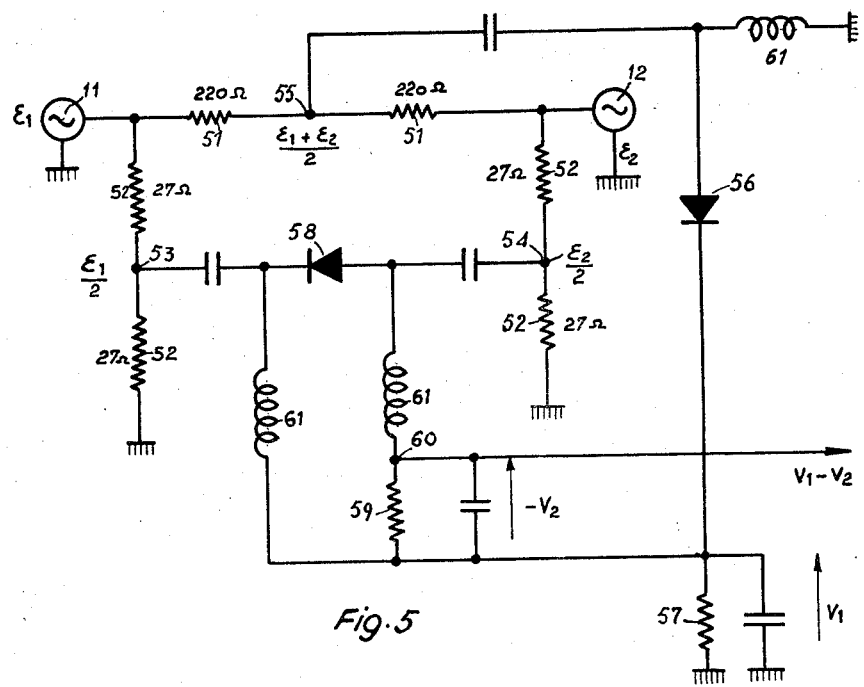
Fig. 5 is a schematic diagram of a first embodiment of the phase detector, according to the invention.

Fig. 5 shows a particular embodiment of the device according to the invention.

In the example shown, and for a better understanding of the following, the proportionality constant K is made equal to ½; it is however obvious that K may assume any desired value.

The device operates as follows:

Sources 11 and 12 supplying signals $\epsilon_1$ and $\epsilon_2$, one of the poles thereof being grounded, are connected to three bridges, one of which is formed by two resistances 51 the values of which, selected among the standardized value, are respectively equal, for instance, to 220 ohms, and the two others by four resistances 52, which are all equal, for instance, to 27 ohms.

Under these conditions the points 53 and 54, are brought to voltages $\epsilon_1/2$ and $\epsilon_2/2$ with respect to ground respectively and point 55 to a voltage $$\frac{\epsilon_1+\epsilon_2}{2}$$

This latter voltage is applied to detector 56 and at the output of its load resistance 57, a D.C. voltage $V_1$ is obtained. On the other hand, voltages $\epsilon_1/2$ and $\epsilon_2/2$ are applied differentially to detector 58, and at the output of the load resistance 59 of the latter a voltage $$V_2 = \frac{\epsilon_1-\epsilon_2}{2}$$

is developed.

Resistances 59 and 57 being connected in series, and the diodes 56 and 58 being oppositely connected, the voltage developed between point 60 and ground is equal to $V_1-V_2$. Point 60 and ground are the two output terminals of the device. Choke coils 61 are located, as shown in Fig. 5, in the detecting circuits. It should be noted that the elements of the device are formed of resistances, and are thus aperiodical.

Figure 6:
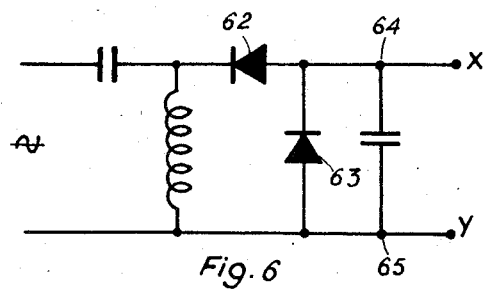
Fig. 6 shows diagrammatically a detecting system comprising a diode used as a load resistance, and showing the same characteristics as the detecting diode of the system.

The detection systems which will have to detect signals of highly varying amplitudes, $V_1-V_2$ being equal to zero for $$=\frac{\pi}{2},\frac{3\pi}{2}\ldots\frac{2n+1\pi}{2}$$

and maximum for $\varphi=0,\pi\ldots n\pi$, will operate on non-linear portions of their characteristic. In order to keep constant the efficiency of the detector whatever may be the amplitude of the input signal, i.e. to maintain a linear detection, in the detecting system shown Fig. 6, the load resistance is formed by a diode 63 which has the same detection characteristic as the rectifying diode 62. The output voltage is collected at the terminals 64 and 65.

Figure 7:
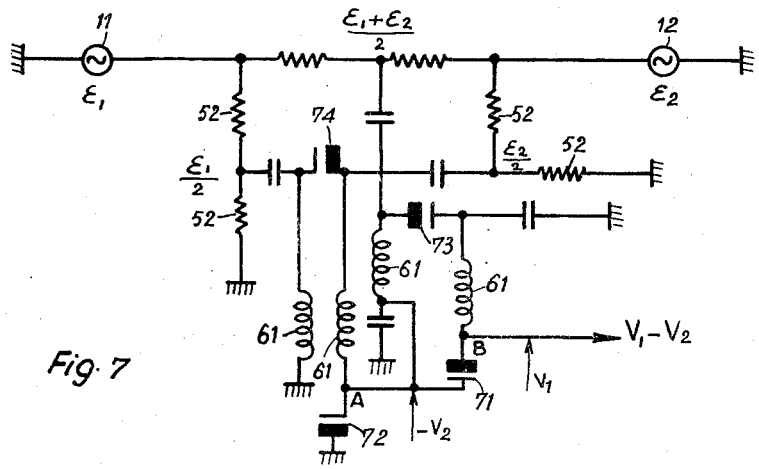
Fig. 7 is a diagram illustrating the principle of a modified embodiment of the device according to the invention.

Fig. 7 is a diagram of the device according to the invention provided with detecting devices of this type. Load resistances 57 and 59 of the device in Fig. 5 are replaced by diodes 71 and 72, respectively, and crystals 56 and 58 are replaced by diodes 73 and 74, all having the same rectifying characteristics.

What we claim is:

1. A circuit for measuring the phase difference between a first and a second alternating potential of same amplitude, comprising in combination a first and a second input; means applying said potentials respectively to said first and said second inputs; a first impedance bridge connecting said first input to said second input and having an output; a first detecting device having a first load resistor and connected to said output for generating a first direct current voltage; a second and a third impedance bridge having respectively a first and a second input and one output; means applying said potentials respectively to said first inputs of said second and said third bridges, and grounding said second inputs; a second detecting device having two electrodes; means respectively connecting said electrodes to said outputs of said first and said second bridges a load resistor connected to one of said electrodes and providing a second direct current voltage; said two load resistors having each two terminals, means for connecting said two load resistors to each other by one terminal with the respective voltages across them in opposition; and connections to the other terminals for providing a voltage which is the difference between said first and said second direct current voltages.

2. A circuit for measuring the phase difference between a first and a second alternating potential of same amplitude, comprising in combination: a first and a second input; means applying said potentials respectively to said first and said second inputs; a first resistor bridge connecting said first input to said second input and having an output; a first detecting device having a first load resistor and connected to said output for generating a first direct current voltage; a second and a third resistor bridge, having respectively a first and a second input and one output; means applying said potentials respectively to said first inputs of said second and said third bridges, and grounding said second inputs; a second detecting device having two electrodes; means respectively connecting said electrodes to said outputs of said first and said second bridges and a load resistor connected to one of said electrodes for providing a second direct current voltage; said two load resistors having each two terminals, means for connecting said two load resistors to each other by one terminal with the respective voltages across them in opposition; and connections to the other terminals for providing a voltage which is the difference between said first and said second direct current voltages.

3. A circuit as claimed in claim 1, wherein said detecting devices comprise respectively a rectifying diode, and a non linear load resistor.

4. A circuit as claimed in claim 3 wherein said resistors are diodes identical to said rectifying diodes respectively.

References Cited in the file of this patent
UNITED STATES PATENTS

| 2,281,995 | Purington | May 5, 1942 |
| 2,640,939 | Staschaver et al. | June 2, 1953 |
| 2,759,109 | Swift | Aug. 14, 1956 |

FOREIGN PATENTS

| 730,790 | France | May 23, 1932 |

OTHER REFERENCES

AIEE Miscellaneous Paper 51–349, September 1951, article by Detwiler.